Figure 1:
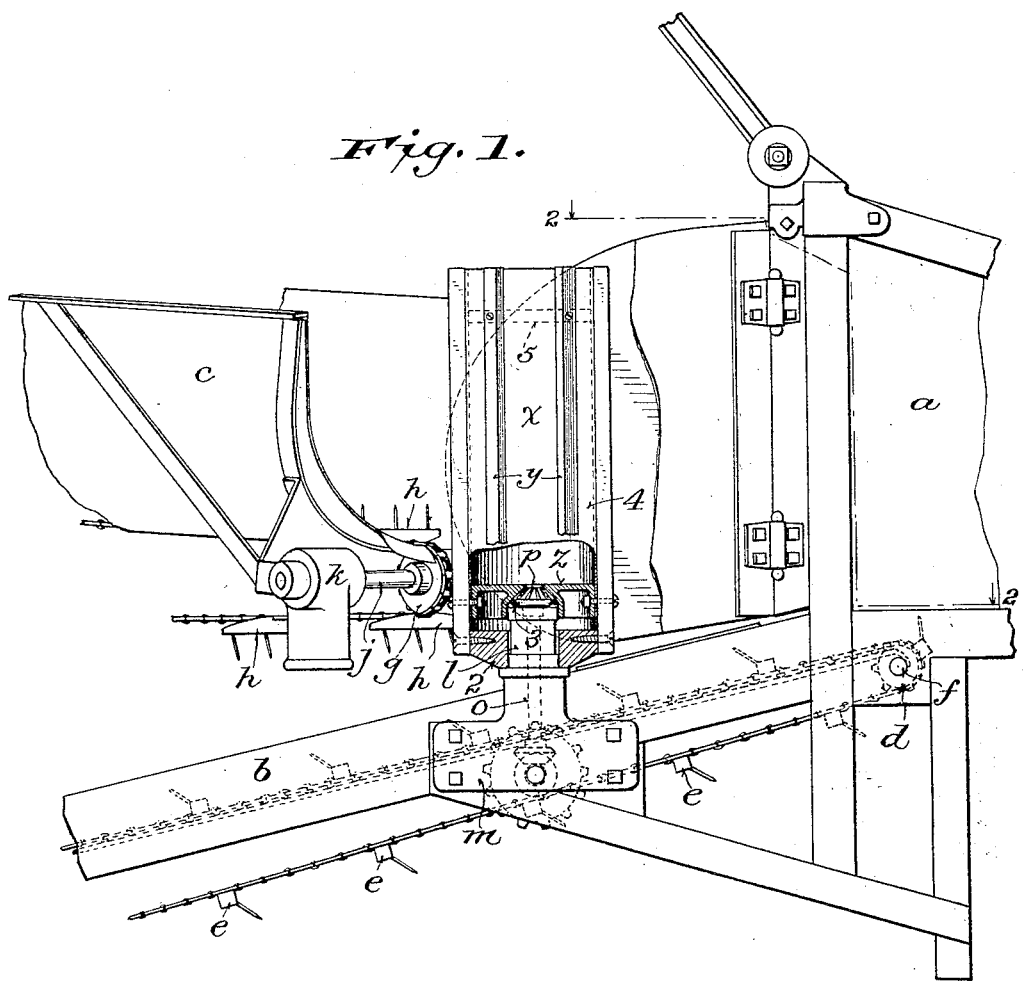

A. WIEGERT.
FEEDING MECHANISM FOR THRESHING MACHINES.
APPLICATION FILED SEPT. 26, 1912.

1,056,138.

Patented Mar. 18, 1913.
2 SHEETS—SHEET 1.

A. WIEGERT.
FEEDING MECHANISM FOR THRESHING MACHINES.
APPLICATION FILED SEPT. 26, 1912.
1,056,138.
Patented Mar. 18, 1913.
2 SHEETS—SHEET 2.
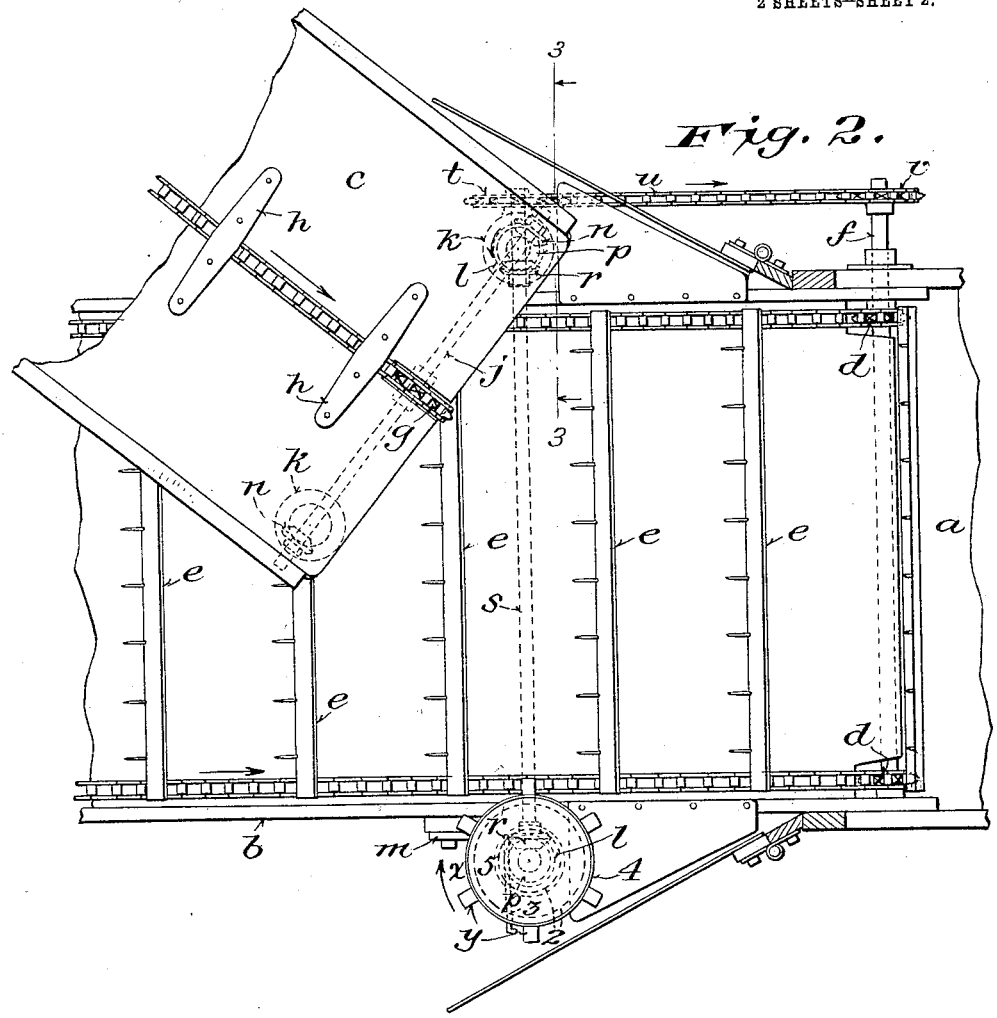
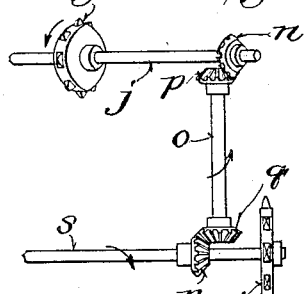

UNITED STATES PATENT OFFICE.

ADOLPH WIEGERT, OF GREENLEAF, WISCONSIN.

FEEDING MECHANISM FOR THRESHING-MACHINES.

1,056,138.  Specification of Letters Patent.  Patented Mar. 18, 1913.

Application filed September 26, 1912. Serial No. 722,412.

*To all whom it may concern:*

Be it known that I, ADOLPH WIEGERT, a citizen of the United States, residing at Greenleaf, in the county of Brown and State of Wisconsin, have invented certain new and useful Improvements in Feeding Mechanism for Threshing-Machines, of which the following is a specification, reference being had to the accompanying drawing, forming a part thereof.

This invention relates more particularly to threshing machines having swinging side or wing carriers which are detachably connected with the straight carriers on either side thereof and are adjustable to different angular positions relative to the straight carriers.

The main objects of the invention are to prevent the clogging or choking of the passage of the grain or the like as it is delivered by the wing carrier upon the straight carrier, and generally to improve the construction and operation of feeding mechanism for threshing machines.

In the accompanying drawing like characters designate the same parts in the several figures.

Figure 1 is a side elevation of the feed end of a threshing machine body with a portion of the feeding mechanism embodying the present invention, the lower part of the deflector wheel being broken away and shown in section; Fig. 2 is a plan view and horizontal section on the line 2—2, Fig. 1; and Fig. 3 is an elevation of a portion of the driving connections for the conveyer of the wing carrier and the deflector wheel, the plane of the elevation and the direction of view being indicated by the dotted line 3—3, and arrows on Fig. 2.

Referring to Figs. 1 and 2 of the drawing, $a$ designates the feed end of a threshing machine body, $b$ the straight carrier, and $c$ the swinging side or wing carrier, of well known construction and arrangement. The straight carrier is provided with the usual conveyer, comprising link belts running over and driven by sprocket wheels $d$ on a transverse shaft $f$ at their inner ends, and provided at intervals with transverse rakes $e$ for feeding the bundles or grain to be threshed into the machine.

The swinging side or wing carrier $c$, which is of troughlike construction for conveying the bundles or grain from a stack or mow in a barn or shed to the straight carrier, is provided with the usual conveyer comprising a link belt running over and driven by a sprocket wheel $g$ at its inner end, and rakes $h$ attached at intervals to the belt and adapted to travel on the upper side thereof along and close to the concave bottom of the troughlike carrier. The sprocket wheel $g$ is mounted on a transverse shaft $j$ having bearings at its ends on the under side and at the inner end of the carrier $c$. The shaft $j$ is provided adjacent to its ends with gear cases and members $k$ of swivel couplings for pivotally connecting it with the machine on either side of the straight carrier. The gear cases and coupling members $k$ in which the shaft $j$ turns freely, are each formed or provided with a downwardly extending socket which is removably fitted and adapted to turn on upwardly projecting cylindrical extensions $l$ of brackets $m$ attached to the sides of the carrier $b$ adjacent to the feed opening into the threshing machine. Within the gear cases and coupling members $k$, the shaft $j$ is provided with bevel pinions or gears $n$. Upright shafts $o$ having bearings in the brackets $m$ and extending through and concentric with their upward cylindrical extensions $l$, are provided at their upper ends with bevel pinions or gears $p$, and at their lower ends with similar pinions or gears $q$. The pinions or gears $q$ mesh with similar bevel pinions or gears $r$ on a shaft $s$, extending across the straight carrier $b$ and having bearings in the brackets $m$. This shaft may be connected with and driven from any convenient part of the threshing machine. In the present case it is shown as provided at one end with a sprocket wheel $t$, which is connected by a link belt $u$ with a sprocket wheel $v$ on the shaft $f$, which drives the conveyer of the straight carrier.

The wing carrier $c$ having a coupling member $k$ on each side at its delivery end, may be connected with the machine on either side of the straight carrier $b$ by placing one of said members in working position on the cylindrical extension $l$ of the bracket $m$ on the corresponding side of the straight carrier. When the wing carrier is thus connected with either side of the straight carrier, one of the pinions or gears $n$, meshes with the pinion or gear $p$ on the upper end of one of the shafts $o$, and the conveyer of the wing carrier will be driven from the shaft $s$ through the shafts $o$ and $j$ and their connecting pinions or gears, in whatever angular position the wing carrier may be set relative to the straight carrier. The wing carrier c may be adjusted vertically to any desired inclination by turning it on the shaft j, and may be swung horizontally on the shaft o, with which it is connected, to any desired angle relative to the straight carrier b.

The parts hereinbefore described are of well known construction and arrangment, and no claim to them *per se* is made herein, the present invention consisting in the deflector wheel hereinafter described and its arrangement and combination with a straight carrier, a swinging side or wing carrier, and mechanism for operating the conveyer of the wing carrier.

In the operation of feeding mechanism of this kind, trouble and loss of time resulting from the tendency of the grain or the like to become twisted and entangled and to clog or choke the passageway at the point of delivery from the wing carrier upon the straight carrier, have occurred, particularly when the wing carrier stands at a sharp or abrupt angle to the straight carrier. This trouble is obviated by providing the feeding mechanism with a deflector wheel x, which is removably mounted in rotating connection with the upright shaft o on the opposite side of the straight carrier from that with which the wing carrier is pivotally connected. This wheel is preferably made of hollow cylindrical or polygonal form, and is provided on the outer side with longitudinal wings or flights y, to more effectively straighten and direct the grain as it is delivered from the wing carrier c upon the straight carrier b and fed by the traveling rakes e into the machine. Adjacent to its lower end the wheel x is provided, as shown in Fig. 1, with a centrally recessed seat z, which fits over and engages with the bevel pinion or gear p on the opposite side of the straight carrier from that with which the wing carrier c is connected. A perforated head or collar 2, secured in or to the lower end of the wheel x and fitting loosely around the cylindrical extension l of the associated bracket m, coöperates with the recessed seat z, of which it is in effect an extension, to firmly support and guide said deflector wheel in its proper working position in axial alinement with the shaft o on which it is mounted. It may be fastened in place on the gear or pinion p by a pin 3 inserted through a transverse hole in the seat z underneath the rim of said gear or pinion at one side thereof, as shown in section in Fig. 1 and indicated by dotted lines in Fig. 2, although this is ordinarily unnecessary.

The wheel x may be conveniently constructed as shown, of a sheet metal drum 4, bolted, riveted or screwed to the seat z, the lower perforated head or collar 2 and an upper head 5, indicated by dotted lines in Fig. 1, and the wings or flights y, may be made of wood and fastened with the drum or shell 4 to the seat z and heads 2 and 5. The wheel is made of a length to extend upwardly approximately to the plane of the top of the wing carrier c, and being located approximately in line with the side of the wing carrier opposite its pivotal connection with the straight carrier and rotated in the direction indicated by an arrow on Fig. 2, turns the grain or the like as it is delivered from the wing carrier upon the straight carrier into the direction of the straight carrier toward the opening into the threshing machine, thereby effectively preventing the clogging or choking of the passageway at this point and facilitating the feeding of the machine. The wing carrier c and the deflector wheel x may be readily shifted from either side of the straight carrier b to the other, so as to feed the machine from either side according to the location of the grain or the like in the mow or stack from which it is taken.

Various changes in details of construction and arrangement of parts may be made without departing from the principle of the invention as defined in the following claims.

I claim:

1. In feeding mechanism for threshing machines, the combination with a straight carrier, a wing carrier pivotally connected with one side of the straight carrier, and an upright driving shaft on the opposite side of the straight carrier from the wing carrier, of a deflector wheel mounted on the upper end of said shaft and adapted to direct grain or the like as it is delivered from the wing carrier upon the straight carrier into the feed opening of the threshing machine.

2. In feeding mechanism for threshing machines, the combination with a straight carrier, upright driving shafts on opposite sides of the straight carrier, and a wing carrier pivotally and detachably connectible with either of said shafts, of a deflector wheel detachably connectible with either of said shafts and adapted to direct grain or the like as it is delivered from the wing carrier upon the straight carrier into the feed opening of the threshing machine.

3. In feeding mechanism for threshing machines, the combination with a straight carrier, a wing carrier pivotally connected with one side of the straight carrier, and an upright driving shaft located on the opposite side of the straight carrier from the wing carrier and provided at its upper end with a bevel gear, of a deflector wheel provided in its lower end with a central recessed seat fitting over said gear in rotating engagement therewith.

4. In feeding mechanism for threshing machines, the combination with a straight carrier, a wing carrier pivotally connected with one side of the straight carrier and an upright driving shaft on the opposite side of the straight carrier from the wing carrier, of a deflector wheel provided with longitudinal wings and mounted on the upper end of said shaft in position to direct grain or the like as it is delivered from the wing carrier upon the straight carrier into the feed opening of the threshing machine.

In witness whereof I hereto affix my signature in presence of two witnesses.

ADOLPH WIEGERT.

Witnesses:
CHARS. WOBECK,
HELMUTH F. PRUST.

Copies of this patent may be obtained for five cents each, by addressing the "Commissioner of Patents, Washington, D. C."